(12) United States Patent
Keusenkothen

(10) Patent No.: US 8,440,070 B2
(45) Date of Patent: *May 14, 2013

(54) PROCESS AND APPARATUS FOR CONVERTING HIGH BOILING POINT RESID TO LIGHT UNSATURATED HYDROCARBONS

(75) Inventor: Paul F. Keusenkothen, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/814,178

(22) Filed: Jun. 11, 2010

(65) Prior Publication Data

US 2011/0011768 A1    Jan. 20, 2011

Related U.S. Application Data

(60) Provisional application No. 61/226,499, filed on Jul. 17, 2009.

(51) Int. Cl.
  *C10G 57/00* (2006.01)
  *C10G 55/04* (2006.01)

(52) U.S. Cl.
  USPC .................. 208/67; 208/69; 208/70

(58) Field of Classification Search .......... 208/67, 208/69, 70
  See application file for complete search history.

(56) References Cited

U.S. PATENT DOCUMENTS

| | | | |
|---|---|---|---|
| 4,443,325 A | 4/1984 | Chen et al. | |
| 4,773,986 A | 9/1988 | Feldman et al. | |
| 5,413,702 A * | 5/1995 | Yan | 208/97 |
| 7,119,240 B2 * | 10/2006 | Hall et al. | 585/541 |
| 7,193,123 B2 | 3/2007 | Stell et al. | |
| 7,220,887 B2 | 5/2007 | Stell et al. | |
| 7,553,460 B2 * | 6/2009 | Stell et al. | 422/609 |
| 7,588,737 B2 * | 9/2009 | Stell et al. | 422/639 |
| 7,914,667 B2 * | 3/2011 | Keusenkothen et al. | 208/128 |
| 7,972,498 B2 * | 7/2011 | Buchanan et al. | 208/61 |
| 7,993,435 B2 * | 8/2011 | Stell et al. | 96/293 |
| 8,106,248 B2 * | 1/2012 | Keusenkothen et al. | 585/400 |
| 8,119,076 B2 * | 2/2012 | Keusenkothen et al. | 422/187 |
| 2004/0002553 A1 | 1/2004 | Hall et al. | |
| 2007/0090018 A1 | 4/2007 | Keusenkothen et al. | |
| 2007/0090019 A1 | 4/2007 | Keusenkothen et al. | |
| 2007/0090020 A1 | 4/2007 | Buchanan et al. | |
| 2007/0191664 A1 | 8/2007 | Hershkowitz et al. | |
| 2008/0300438 A1 | 12/2008 | Keusenkothen et al. | |
| 2009/0008292 A1 | 1/2009 | Keusenkothen et al. | |
| 2011/0000819 A1 * | 1/2011 | Keusenkothen | 208/89 |

FOREIGN PATENT DOCUMENTS

| | | |
|---|---|---|
| WO | 02/072741 | 9/2002 |
| WO | 2007/003892 | 1/2007 |

* cited by examiner

*Primary Examiner* — Ellen McAvoy

(57) ABSTRACT

A process and apparatus process for preparing a resid-containing hydrocarbon feedstock for use in a regenerative pyrolysis reactor, comprising (a) feeding a resid-containing hydrocarbon feedstock to a thermal cracking unit; (b) thermally cracking at least about 60 wt. % of said resid having a boiling point of at least 565° C. in said hydrocarbon feedstock to form a vapor phase containing cracked hydrocarbons; (c) separating said vapor phase from remaining non-volatiles; and (d) converting the separated vapor phase in a regenerative pyrolysis reactor system.

16 Claims, 2 Drawing Sheets

PROCESS AND APPARATUS FOR CONVERTING HIGH BOILING POINT RESID TO LIGHT UNSATURATED HYDROCARBONS

CROSS REFERENCE TO RELATED APPLICATIONS

This application claims the benefit of and priority to U.S. Ser. No. 61/226,499, filed Jul. 17, 2009, the disclosure of which is herein incorporated by reference in its entirety.

FIELD

This invention relates to a process and apparatus for converting high boiling point resid within a resid-containing hydrocarbon feedstock into feedstock fractions suitable for use in a regenerative pyrolysis reactor system in the manufacture of hydrocarbon products. More particularly the invention relates to a process and apparatus for improving the quality or volatizable fraction of resid-containing feedstocks to a regenerative pyrolysis reactor system.

BACKGROUND

Regenerative pyrolysis reactors are known for use in performing high temperature (e.g., >1200° C., or even >1500° C.) chemistry and cracking processes, including but not limited to execution of cyclic reverse flow reactor processes. Such high temperature pyrolysis processes may generally be referred to as regenerative pyrolysis reactor processes. Such processes include those reactions performed at temperatures higher than can suitably be performed in conventional steam crackers.

As with steam crackers, regenerative pyrolysis reactors are well suited for processing volatized or volatizable feedstocks that are substantially free of non-volatile components, such as metals, and other residual or nonvolatizable components, which would otherwise lay down, coke, ash, and/or build up in the reactor. Non-volatiles may be defined broadly herein to mean substantially any resid, metal, mineral, ash, ash-forming, asphaltenic, tar, coke, and/or other component or contaminant within the feedstock that will not vaporize below a selected boiling point or temperature and which, during or after pyrolysis, may leave an undesirable residue or ash within the reactor system, which is difficult to remove.

Typically, regenerative pyrolysis reactors may include a reactor bed or zone comprising some type of refractory material, such as but not limited to a thermal ceramic media or components where the reaction takes place within the reactor system. Conventional regenerative pyrolysis reactors typically may, for example, deliver a stream of fuel, oxidant, or a supplemental amount of one of these reactants, directly to a location somewhere within the flow path of the reactor bed. The delivered reactants then are caused to exothermically react therein and heat the reactor media or bed. Thereafter, the reaction products are exhausted and a pyrolysis feedstock, such as a vaporized hydrocarbon feed stream, is introduced into the heated region of the reactor media or bed, and exposed to the heated media to cause heating and pyrolysis of the feedstock. The pyrolyzed products are then removed from the reaction area and quenched in a quench region of the reactor system, to halt the pyrolysis reaction and yield a pyrolysis product.

However, as with steam cracking, economics may favor using lower cost feedstocks such as, by way of non-limiting examples, crude oil, heavy distillate cuts, contaminated naphthas and condensates, and atmospheric resids, as feedstocks for regenerative pyrolysis reactors. Unfortunately, these economically favored feedstocks typically contain undesirable amounts of nonvolatile components and have heretofore been unacceptable as regenerative reactor feedstocks. Generally, non-volatile concentrations (e.g., ash, metals, resids, etc.) in excess of 2 ppmw (ppm by weight) of metals in the feed stream to the reactor may cause significant fouling in a pyrolysis reactor. Some economically desirable lower cost feeds may contain in excess of 5 ppmw, or at least 2 wt %, or at least 3 wt %, or at least 5 wt % of nonvolatiles and may be considered an advantaged feed. Some advantages feeds may contain from at least 2 weight percent non-volatile components, and up to or even in excess of 10 percent by weight of non-volatiles, while still other feeds may contain well in excess of 10 weight percent of non-volatiles, even in excess of 20 weight percent, and even in excess of 50 weight percent, including significant quantities of high boiling point hydrocarbon resid, which is difficult to convert into useful chemical precursors. In conventional processes, the resid components are withdrawn as a bottoms stream and added to low value fuels, such as fuel oil.

Various techniques have been employed for treating petroleum hydrocarbon feeds for the removal of non-volatiles contained therein to render cost advantaged feeds suitable for various purposes. For example, U.S. Pat. No. 4,773,986 discloses increased severity visbreaking operations to remove a heavier phase in an amount of less than 15 wt. % and provide a remaining product having a Shell Hot Filtration number of less than 0.25, by treating product from the visbreaker to separate components that affect product stability by use of a promoter liquid or anti-solvent. U.S. Pat. No. 5,413,702 discloses a process of visbreaking residual oil to produce fuel oil or distillate, wherein visbreaking is conducted at high severity in a liquid phase, fluidized bed reactor with a hydrogen quench in the settling zone.

Other processes tend to improve the quality of hydrocarbon feeds containing non-volatiles for conventional steam cracking. However, in most instances the processes suffer from operating condition limitations, space limitations for retrofits, high capital costs, and high operating costs, due to the processing steps used, high capital expense of the required equipment, and/or unsatisfactory reduction limitations in the amount of non-volatiles removed from the feeds. Similar and even exaggerated problems exist for a regenerative pyrolysis reactor complex, due to their feed quality requirements and increased temperature severity.

The present invention provides a process for improving the quality of non-volatile-containing hydrocarbon feedstocks to render such feed suitable for use as a feedstream to a regenerative pyrolysis reactor system. The invention provides a commercially useful and cost effective technique for removing the ash-forming non-volatiles from the feedstock before the feedstock undergoes pyrolysis.

SUMMARY

In one aspect, the invention resides in a process for preparing a resid-containing hydrocarbon feedstock for use in a regenerative pyrolysis reactor, comprising (a) feeding a resid-containing hydrocarbon feedstock to a thermal cracking unit; (b) thermally cracking at least about 60 wt. % of said resid having a boiling point of at least 565° C. in said hydrocarbon feedstock to form a vapor phase containing cracked hydrocarbons, based upon the total weight of said hydrocarbon feedstock having a boiling point of at least 565° C.; (c) separating said vapor phase from remaining non-volatiles; and (d)

converting the separated vapor phase in a regenerative pyrolysis reactor system into a pyrolysis product. Stated differently, the hydrocarbon feedstock of step (a) comprises some resid components, at least some of which have a boiling point of at least 565° C. (e.g., high boiling components) and in step (b) at least 60 wt % of such high boiling components are thermally cracked, such as breaking carbon-carbon bonds and/or breaking some carbon-hydrogen bonds, or breaking other atomic bonds in the high boiling component.

In another embodiment, the process wherein the thermal cracking unit comprises a visbreaker and the process further comprises feeding a gas selected from the group consisting of hydrogen, methane and combinations thereof to said visbreaking unit while thermally cracking said resid.

The process wherein said thermal cracking unit comprises a coker and said process comprises thermally cracking said resid in said coker.

Advantageously, the gas is at a temperature between about 600° C. and 850° C., or from between 650° C. and 750° C., when introduced into said visbreaker.

Preferably, the separated vapor phase is substantially free of non-volatiles, and even more preferably the separated vapor phase contains less than about 2 ppmw metals.

In another embodiment, the process further comprises thermally cracking at least about 70 wt. % of said resid in said thermal cracking unit.

In another aspect, the process further comprises feeding said vapor phase to a vapor/liquid separation unit.

Conveniently, the process further comprises maintaining a temperature of the vapor phase during separation at a temperature between about 200° C. to about 750° C.

Advantageously, the regenerative pyrolysis reactor system heats the separated vapor phase to a temperature of at least about 1200° C., preferably at least about 1500° C., to produce said pyrolysis product.

In one embodiment, at least 75 wt. % of said resid-containing hydrocarbon feedstock is vaporized and fed to said regenerative reactor system, based upon the total weight of said hydrocarbon feedstock.

In another embodiment, the vapor phase is converted in said regenerative pyrolysis reactor system to form said pyrolysis product comprising $C_2$-$C_4$ unsaturated hydrocarbons.

In another embodiment, the invention is directed to an apparatus for preparing a resid-containing hydrocarbon feedstock for conversion in a regenerative pyrolysis reactor, comprising (a) a thermal cracking unit for cracking at least a portion of resid having a boiling point of at least 565° C. in a resid-containing hydrocarbon feedstock; (b) a separator unit to separate a vapor phase containing cracked hydrocarbons from remaining non-volatiles; and (c) a regenerative pyrolysis reactor to convert said separated vapor phase hydrocarbons to a pyrolysis product.

In one embodiment, the thermal cracking unit includes at least one of a visbreaking unit and a coker. Many embodiments will include a visbreaker as the thermal cracking unit to crack at least 60 wt. % of those fractions of the hydrocarbon feed having a boiling point in excess of 565° C. Other embodiments may utilize a coker to do such cracking of the feed in the resid. Still other embodiments may use a combination of both. In yet other embodiments, other heat soaking, thermal, and/or catalytic cracking systems, processes, and apparatus may be used to crack the components boiling at or above 565° C.

According to the present invention, the regenerative pyrolysis reactor comprises (i) a reaction zone for converting the separated vapor phase to $C_2$-$C_4$ unsaturated hydrocarbons within the reaction zone, and (ii) a quenching zone to quench the $C_2$-$C_4$ unsaturated hydrocarbons.

Advantageously, the pyrolysis reactor system comprises a reverse flow regenerative pyrolysis reactor system.

In a preferred embodiment, the separator unit is at least one of a distillation column, a flash drum, or a knockout drum.

In one embodiment, the apparatus further comprises at least one of a methane feed or a hydrogen feed to said visbreaking unit.

Preferably, the regenerative pyrolysis reactor comprises (i) a first reactor having first and second ends and a first channel for conveying a first reactant from said first to said second end, and a second channel for conveying a second reactant from said first to said second end; and (ii) a second reactor having primary and secondary ends, wherein the first and second reactors are oriented in a series flow relationship with respect to each other.

The regenerative pyrolysis reactor can have at least one of the first channel and the second channel which are separated by a barrier that prevents at least a majority of a stoichiometrically reactable first reactant from reacting with the second reactant within the first reactor.

In a preferred embodiment, the thermal cracking unit is configured to crack at least 60 wt. %, or even 70 wt. % of said resid, based upon the total weight of said resid, that is, said hydrocarbon feedstock fractions having a boiling point of at least 565° C.

In another embodiment, the present invention is directed to a vaporized hydrocarbon feedstock for a regenerative pyrolysis reactor system wherein said vaporized feedstock is derived from a process comprising (a) thermally cracking at least 60 wt. % of resid having a boiling point of at least 565° C. in a resid-containing hydrocarbon feedstock to form a vapor phase containing cracked hydrocarbons based upon the total weight of said hydrocarbon feedstock having a boiling point of at least 565° C., and (b) separating said vapor phase from remaining non-volatiles.

In a further embodiment, the vaporized hydrocarbon feedstock has at least 70 wt. % of said resid thermally cracked and vaporized.

Conveniently, at least 70 wt. % of said hydrocarbon feedstock is vaporized.

DETAILED DESCRIPTION OF THE EMBODIMENTS

Figure 1:
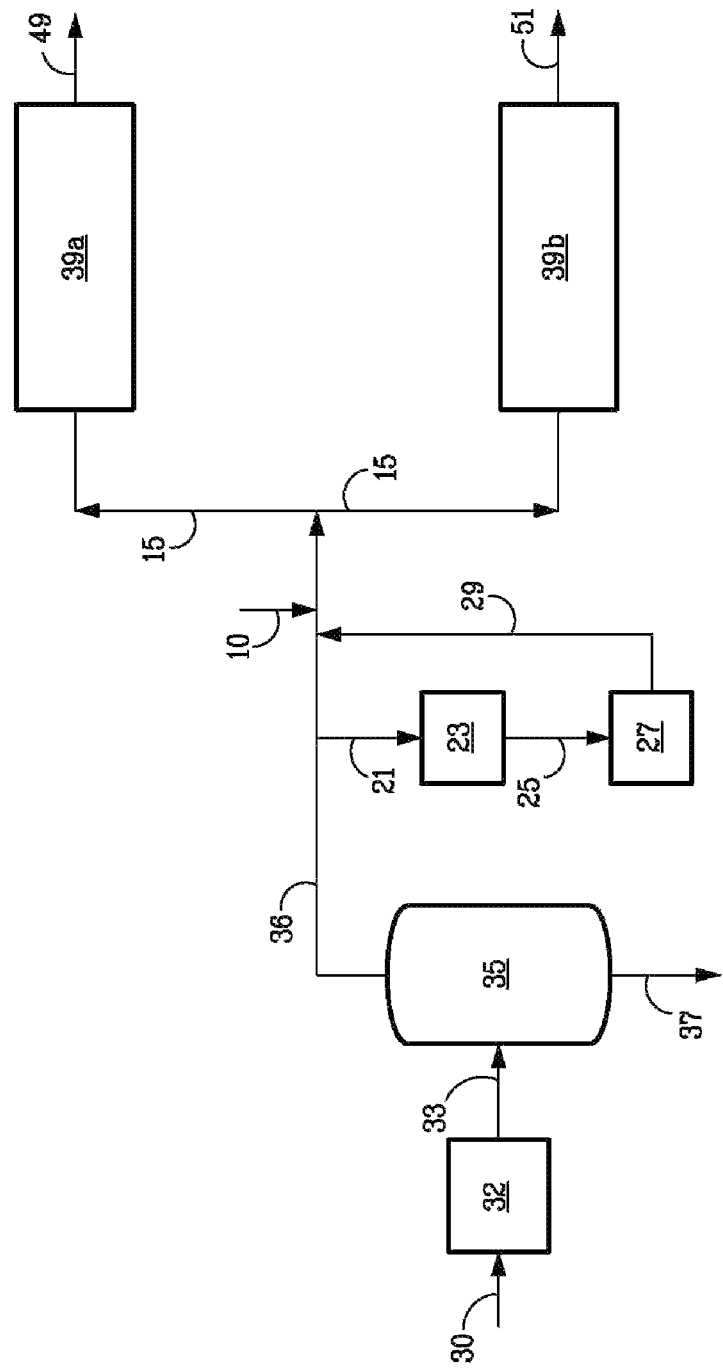
FIG. 1 is a simplified process flow diagram illustrating an embodiment of the invention.

The terms "convert" and "converting" are defined broadly herein to include any molecular decomposition, cracking, breaking apart, conversion, and/or reformation of organic molecules in the hydrocarbon feed, by means of at least pyrolysis heat, and may optionally include supplementation by one or more of catalysis, hydrogenation, diluents, and/or stripping agents.

As used herein, the expression "essentially free of non-volatiles" means that concentration of non-volatiles in the vapor phase is reduced to an extremely low level. Those skilled in the art know that it is difficult to obtain a complete separation of non-volatiles from a hydrocarbon feedstock such as crude oil. As a result, the vapor phase may contain a trace amount of non-volatiles. Therefore, in the context of the present invention, while it is the objective that the vapor phase contains no non-volatiles, it is recognized that the vapor phase may contain an acceptable trace amount of non-volatiles, e.g., typically an amount of 2 ppmw or less, but still be considered essentially free of non-volatiles. The separated vapor phase preferably contains less than 1 ppmw of non-volatiles. More preferably, the vapor phase contains less than 0.5 ppmw of non-volatiles. Variables such as the pyrolysis conditions and reactor design will dictate an appropriate threshold cutoff for non-volatile carryover in the vapor phase, for a specific application.

Substantially any hydrocarbon feedstock containing a mixture of both volatiles and non-volatiles can advantageously be utilized in the process. Examples of such feedstock include one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, naphtha, crude oil, atmospheric pipestill bottoms, vacuum pipestill streams including bottoms, virgin naphtha, wide boiling range naphthas, heavy non-virgin hydrocarbon streams from refineries, vacuum gas oil, heavy gas oil, naphtha contaminated with crude, atmospheric resid, heavy residuum, $C_4$'s/residue admixture, condensate, contaminated condensate, naphtha residue admixture and mixtures thereof. The hydrocarbon feedstock may have a nominal end boiling point of at least 400° F. (200° C.) and will commonly have a nominal end boiling point of at least 500° F. (260° C.). Some preferred hydrocarbon feedstocks include crude oil, atmospheric resids, contaminated condensate, and gas oil distillates, tars, fuel oils and cycle oils. The vaporized hydrocarbon feed may be supplemented with substantially any other hydrocarbon co-feed material that undergoes the endothermic reforming, such as to acetylene, including natural gas mixtures, other petroleum alkanes, petroleum distillates, kerosene, jet fuel, fuel oil, heating oil, diesel fuel and gas oil, gasoline, and alcohols. A preferred co-feed may be a hydrocarbon component that may function as a hydrogen donor diluent, such as methane, tetralin, and dihydroanthracene, hydropyrene, or hydrotreated steam cracked tar oils. Preferably, the feed will be in a vapor or gaseous state at the temperature and pressure of introduction into the reactor system.

According to the present invention, a process for converting hydrocarbon resid into chemical feedstock precursors is disclosed, comprising thermally cracking hydrocarbon resid under high severity conditions, such that at least about 60 wt. %, even at least about 70 wt. %, or even at least about 75 wt. % of hydrocarbon resid boiling at or above 1050° F. (565° C.+, as determined by ASTM D2887) in a resid-containing hydrocarbon feedstock to form a vapor phase containing cracked hydrocarbons, separating said vapor phase from remaining non-volatiles, and converting the separated vapor phase in a regenerative pyrolysis reactor system to form $C_2$-$C_4$ unsaturated hydrocarbons. The thermal cracking unit can be a high severity visbreaker, or a high severity coker. Under such high severity conditions, enough hydrocarbon resid can be cracked to result in vaporization of greater than about 75 wt. % of hydrocarbon feedstocks containing high levels of resid, meaning at least 2 wt % of reside, such as at least about 10 wt. % resid, even at least about 20 wt. % resid, and even more than 25 wt. % resid. The resid amount includes the weight of volatiles boiling above 565° C. according to ASTM D2887 and also includes the weight of nonvolatizable components therein.

When using a visbreaker, the process further comprises feeding a hot gas, preferably a superheated gas selected from the group consisting of hydrogen, methane and combinations thereof to a visbreaking unit to thermally crack said resid. The temperature of said hot gas can be between 600° C. (1100° F.) and 850° C. (1500° F.), or from 650° C. (1202° F.) and 750° C. (1382° F.) and may sometimes preferably be about 700° C. (1300° F.).

The conditions under which the hydrocarbon feedstock is thermally cracked will vary depending upon composition of the hydrocarbon feedstock, and the desired cut-off point for distinguishing the vaporized fraction and the remaining non-volatiles fraction. Commonly, the non-volatile-containing hydrocarbon feedstock comprises a liquid phase and the feedstock is heated to a temperature at which at least 75 wt. % of the liquid phase hydrocarbon feedstock is converted to a vapor phase, preferably greater than 90 wt. %, and more preferably greater than 98 wt. % of the feedstock is vaporized. Exemplary cracking temperatures may range from 400° F. to 1200° F. (200° C. to 650° C.). Preferably, the hydrocarbon feedstock is heated to a temperature from 450° F. to 1000° F. (230° C. to 540° C.), and more preferably from 500° F. to 950° F. (260° C. to 510° C.). Some of the non-volatiles contained in the hydrocarbon feedstock, such as metals and metal complexes, cannot be cracked or vaporized and they remain within the nonvolatized liquid or solid phase. The fraction of non-volatiles in each of the vapor/liquid or solid phases is a function of both the hydrocarbon partial pressure and the temperature to which the hydrocarbon feedstock is heated. Thermally cracking substantially all of the resid may become more difficult with heavier feedstocks.

After thermal cracking, the cracked and vaporized hydrocarbons are separated from any remaining non-volatiles, such as metals. For identification purposes, the vaporized or volatized fraction of the separated feed stream may be referred to herein as the separated vapor phase, even if such fraction is wholly or fully condensed, partially cooled or condensed, stored, and/or later revaporized, prior to feeding into the pyrolysis furnace. Preferably the separated vapor phase is fed to the pyrolysis furnace in a vapor/gas phase.

FIG. 1 illustrates a simplified schematic flow diagram of a non-limiting embodiment of the invention, including feeding a hydrocarbon feedstock that contains non-volatile components therein via inlet line (30) to a high severity thermal cracking unit (32). In thermal cracking unit (32), the hydrocarbon feedstock is heated to a temperature that is sufficient to thermally crack at least about 60 wt. %, preferably at least about 70 wt. %, and even more than 75 wt. %, such as up to 75 wt. %, or up to 80 wt. %, or up to 90 wt. %, or up to 95 wt. %, or up to 98 wt. %, or even substantially all (or any ranges therein or combinations thereof) of the hydrocarbon fractions or components boiling at or above 565° C.+ that are entrained within the hydrocarbon feedstock are cracked. Thereby, a significant fraction of the cracked portion can then be vaporized to form a vapor phase containing cracked hydrocarbons, and in the case where the thermal cracking unit is a high severity visbreaker, a liquid phase containing remaining non-volatiles. Preferably, at least 70 wt. % of the total weight of the hydrocarbon feedstock may ultimately be vaporized and fed to the regenerative pyrolysis system for use, consumption, and/or further cracking. Alternatively, when the thermal cracking unit is a high severity coker, the remaining non-volatiles are precipitated as solids in the coke.

Referring still to FIG. 1, in the case of a visbroken feedstock, it can be transferred via line (33) to a separation unit (35), where the vapor phase is separated from the liquid phase. Examples of equipment suitable for separating the vapor phase from the liquid phase include knockout drum (e.g., substantially any vapor-liquid separator), a flash drum, distillation column/unit, flash drum having a heating means within the drum, a knockout drum having heating means within the knock-out drum, and combinations thereof. During separation the temperature of the vapor phase is maintained between about 200° C. to about 750° C. When cracking with a high severity coker, the vapor phase is readily separated from the remaining non-volatiles, which are deposited in solid form in the coke, without a separation unit.

Although the thermal cracking unit (32) and separation unit (35) are each shown in FIG. 1 as respective single and separate units, each of these units can alternatively comprise a plurality of units, e.g., a separation unit can include more than one knockout drums, separators, and/or flash drums. As discussed below, the thermal cracking unit (32) and separation unit (35) may also be combined or integrated into substantially a common unit, such as a high severity coker. A primary objective of the feed separation step is to remove ashing precursors, such as metal complexes.

Advantageously, the high severity conditions of the thermal cracking step of the present process results in greater quantities of vapor phase available for pyrolysis and conversion into suitable chemical precursors due to the cracking of high boiling (565° C.+) hydrocarbon resid. By thermally cracking the high boiling resid component, the amount of vapor phase can be increased such that as much as 75 wt. %, even as much as 85 wt. %, or even more than 90 wt. % of a resid-containing hydrocarbon feed is vaporized.

The non-volatile-containing liquid phase may be withdrawn or removed from separation zone (35) as a bottoms stream, such as via line (37). The separated vapor phase may be withdrawn from separation unit (35) as an overhead stream via line (36) and passed to one or a plurality (two or more) of pyrolysis reactors (39a) and (39b) via lines (15). U.S. patent application Ser. No. 12/121,353, filed May 15, 2008 and incorporated herein by reference in its entirety, discloses a regenerative pyrolysis reactor suitable for use in the present inventive process and apparatus.

The separated, vaporized hydrocarbons may include various concentrations of associated gases, such as ethane and other alkanes. The vaporized fraction may also include impurities, such as $H_2S$ and/or nitrogen, and may be sweetened before feeding to the reactor system. Methane, including a methane-containing feed, (10) may be mixed (e.g., commingled, introduced, fed into, or otherwise combined) into the separated vapor phase line at substantially any point from, and including, the separator (35) to the pyrolysis unit(s) (39a) (39b). A convenient place for introduction of the methane-containing feed may be a transfer line (36), such as illustrated by methane feed line (10). Alternatively, the vapor phase essentially free of non-volatiles can be removed via line (21), cooled to a liquid in cooling unit (23), and then transferred via line (25) to storage unit (27). The liquid (or a portion thereof) can be transferred from storage unit (27) via line (29) to line (36) and then passed or transferred in substantially parallel flow, such as via lines (15), to pyrolysis reactors (39a) and (39b). The cracked reaction product may then be transferred to product-separation processes, such as via outlet lines (49) and (51).

According to a preferred process, the methane and separated vapor feed are exposed to a previously heated hot spot or reaction zone within the reactor system for a determined appropriate residence time (typically less than 1.0 second, commonly less than 0.5 second, and often less than 0.1 second, while a preferred range of 1-100 ms is preferred) and then quenched to stop the reaction to provide the desired selectivity to a preferred hydrocarbon product mix or pyrolysis product within the cracked product stream. Longer reaction times tend to favor the formation of coke. In many preferred applications, the reaction will be allowed to proceed for sufficient time to crack the vapor phase hydrocarbons into smaller components, such as methyl groups (e.g., $CH_4$, $CH_3$, and $CH_2$) and hydride radicals. At least a portion of the introduced or intermediately produced methane or methyl radicals are converted to acetylene pyrolysis product in the reactor system. Aromatic molecules, particularly polycyclic aromatic molecules derived from resid, may similarly be converted to acetylenes or diacetylenes pyrolysis product, rather than being withdrawn as bottoms and mixed into low value fuels, as discussed above. The cracked product mix may include gaseous hydrocarbons of great variety, e.g., from methane to coke precursors, and may include saturated, monounsaturated, polyunsaturated, and aromatic hydrocarbons. In some aspects, the pyrolysis product produced is a dilute acetylene stream (primarily acetylene, with some hydrogen and unreacted methane) that can be easily hydrogenated to an olefin, such as ethylene, in the vapor phase or liquid phase by well-known prior art methods.

Figure 2A:
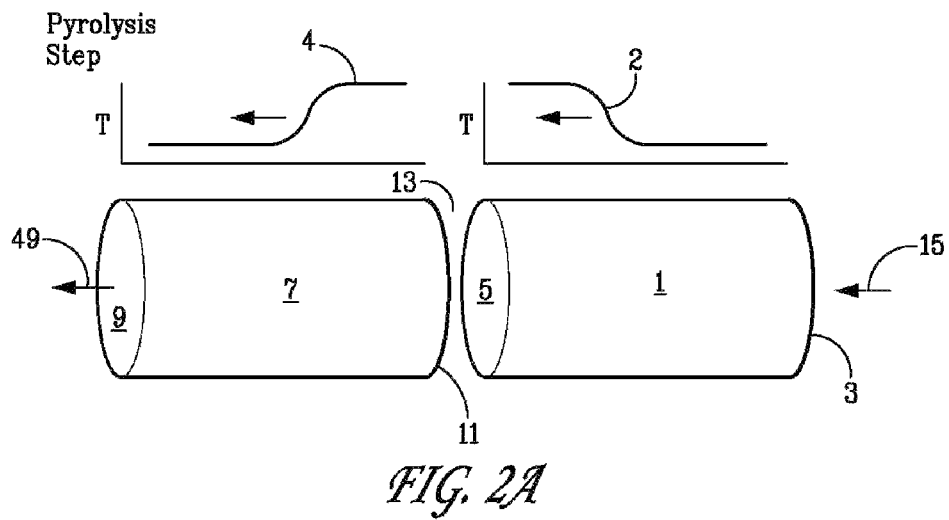
FIGS. 2A and 2B are a simplified, diagrammatic illustration of the two steps in a regenerating reverse flow pyrolysis reactor system according to the present invention.
Figure 2B:
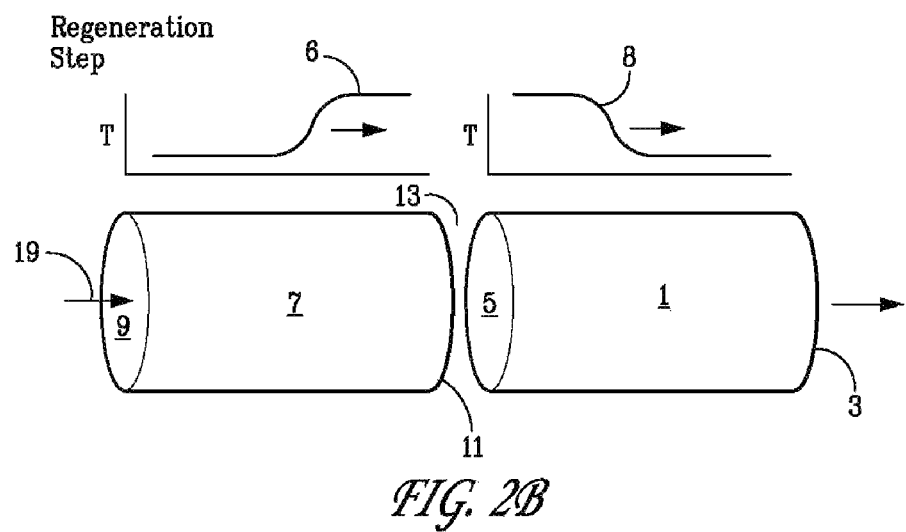

The basic two-step asymmetric cycle of a regenerative bed reactor system is depicted in FIGS. 2A and 2B in terms of a reactor system (FIGS. 1, (39a) and (39b)) having two zones/reactors; a first or recuperator/quenching zone (7) and a second or reaction/reforming zone (1). Both the reaction zone (1) and the recuperator zone (7) contain regenerative beds. The term regenerative reactor means a regenerative media that may also be used for carrying out a chemical reaction. The regenerative beds may comprise bedding or packing material that is effective in storing and transferring heat, such as glass or ceramic beads or spheres, metal beads or spheres, ceramic (including zirconia) or metal honeycomb materials, ceramic tubes, extruded monoliths, and the like, provided they are competent to maintain integrity, functionality, and withstand long term exposure to temperatures in excess of 1200° C. (2192° F.), preferably in excess of 1500° C. (2732° F.), more preferably in excess of 1700° C. (3092° F.), and even more preferably in excess of 2000° C. (3632° F.) for operating margin.

As shown in FIG. 2A, at the beginning of the "reaction" step of the cycle, a secondary end (5) of the reaction zone (1) (a.k.a. herein as the reformer or second reactor) is at an elevated temperature as compared to the primary end (3) of the reaction bed (1), and at least a portion (including the first end (9)) of the recuperator or quench zone (7), is at a lower temperature than the reaction zone (1) to provide a quenching effect for the synthesis gas reaction product. A hydrocarbon containing reactant feed, and preferably also a diluent or stripping agent, such as hydrogen or steam, is introduced via a conduit(s) (15), into a primary end (3) of the reforming or reaction zone (1). Thereby, in one preferred embodiment, the term pyrolysis includes hydropyrolysis.

The feed stream from inlet(s) (15) absorbs heat from the reformer bed (1) and endothermically reacts to produce the desired acetylene product. As this step proceeds, a shift in the temperature profile (2), as indicated by the arrow, is created based on the heat transfer properties of the system. When the bed is designed with adequate heat transfer capability, this profile has a relatively sharp temperature gradient, which gradient will move across the reaction zone (1) as the step proceeds. The sharper the temperature gradient profile, the better the reaction may be controlled.

The reaction gas exits the reaction zone (1) through a secondary end (5) at an elevated temperature and passes through the recuperator reactor (7), entering through a second end (11), and exiting at a first end (9) as a synthesized gas (49) comprising acetylene, some unconverted methyls, and hydrogen. As the synthesized reaction gas passes through the recuperator zone (7), the gas transfers heat to the regenerative bed in the recuperator zone and is quenched or cooled to a temperature approaching the temperature of the recuperator zone substantially at the first end (9), which in some embodiments is preferably approximately the same temperature as the regeneration feed introduced via conduit (19) into the recuperator (7) during the second step of the cycle. As the reaction gas is cooled in the recuperator zone (7), a temperature gradient (4) is created in the zone's regenerative bed(s) and moves across the recuperator zone (7) during this step. After quenching, the reaction gas exits the recuperator at (9) and is processed for separation and recovery of the various components.

The second step of the cycle (FIG. 2B), referred to as the regeneration step, then begins with reintroduction of the first and second regeneration reactants via separated conduits or channels (19) within, for example, the honeycomb reactor bedding material, which has at least one first channel and one second channel which are separated by a barrier that prevents at least a majority of a stoichiometrically reactable first reactant from reacting with the second reactant within the first reactor (7). The first and second combustion reactants pass separately through hot recuperator (7) toward the second end (11) of the recuperator (7), where they are combined for exothermic reaction or combustion in or near a central region (13) of the reactor system. In doing so, the temperature gradients (6) and (8) may move across the beds as illustrated by the arrows on the exemplary graphs in FIG. 2B, similar to but in opposite directions to the graphs of the temperature gradients developed during the reaction cycle in FIG. 2A. The heat recovered from the recuperator zone together with the heat of combustion is transferred to the reaction zone, thermally regenerating the regenerative reaction beds (1) disposed therein.

The conversion of the cracked vapor fraction into higher value hydrocarbons such as acetylene typically requires a high reformation temperature, which in the past has been a significant barrier to commercialization and efficiency. The regenerative pyrolysis reactor system according to this invention is generally a higher temperature hydrocarbon pyrolysis reactor system than steam cracking type hydrocarbon systems that are conventionally used in commercial steam cracking operations. For example, commercial naphtha steam cracking operations typically operate at furnace radiant coil outlet temperatures of less than about 815° C. (1500° F.). However, the terms "regenerative pyrolysis reactor systems" as pertaining to the subject invention refers to cyclical (regenerating) thermal hydrocarbon pyrolysis systems that heat the hydrocarbon stream to be converted (e.g., the separated vapor phase) to temperatures of at least 1200° C. (2192° F.), preferably in excess of 1400° C. (2552° F.), more preferably in excess of 1500° C. (2732° F.), or for some applications, even more preferably in excess of 1700° C. (3092° F.). In some reactions, it may even be still more preferable to heat the feeds for very short time duration, such as less than 0.1 second, to a temperature in excess of 2000° C. (3632° F.). Pyrolysis reactions that benefit from reaction or conversion of the co-fed methane in addition to the hydrocarbon vapor, typically require reactor temperatures in excess of 1400° C. (2552° C.) for the methane to react or convert. An exemplary preferred process may pyrolyze the feed stream within the reactor, such as at temperatures of from about 1500° C. to about 1900° C., and more preferably from about 1600° C. to about 1700° C. Exemplary residency times preferably may be short, such as less than 0.1 second and preferably less than about 5 milliseconds.

The process according to the present invention requires no large pressure swings to cycle the reactants and products through the reactor system. In some preferred embodiments, the reforming or pyrolysis of volatized hydrocarbon step occurs at relatively low pressure, such as less than about 345 kPa (50 psia), while the regeneration step may also be performed at similar pressures, e.g., less than about 345 kPa (50 psia), or at slightly higher, but still relatively low pressures, such as less than about 1724 kPa (250 psia). In some preferred embodiments, the volatized hydrocarbon pyrolysis step is performed at a pressure from about 34 kPa (5 psia) to about 310 kPa (45 psia), preferably from about 103 kPa (15 psia) to about 241 kPa (35 psia). Ranges from about 48 kPa (7 psia) to about 241 kPa (35 psia) and from about 103 kPa (15 psia) to about 310 kPa (45 psia) are also contemplated. The most economical range may be determined without more than routine experimentation by one of ordinary skill in the art in possession of the present disclosure. Pressures higher or lower than that disclosed above may be used, although they may be less efficient.

Some pyrolysis products, however, are still rarely a desired final material for process export. Rather, a preferred use for the produced pyrolysis products, such as acetylene, is as an intermediate product or precursor in a flow process within a chemical plant, in route to other preferred products, such as vinyl esters, ethylene, acetaldehyde, propanal, and/or propanol, acrylic acid, and so on. Typical desired pyrolysis products may be an olefin and/or an alkyne. Some commonly desired olefins may include ethylene, propylene, and/or butylene. Some commonly desired alkynes may include acetylene.

After quenching, the synthesized gas stream may be provided to a separation process that separates the acetylene, methane, hydrogen, and other gases. Recovered methane and hydrogen may be recycled for processing again in the reactor system. Separate process sequences may convert the acetylene to other final products. Each of these products may be further processed to provide yet additional useful products, e.g., acetaldehyde is typically an intermediate in the manufacture of ethanol, acetic acid, butanals, and/or butanols. Ethylene is a basic building block of a plethora of plastics, and may typically be the preferred use for the created acetylene, from the perspective of volume and value. Ethylene is conveniently manufactured from acetylene by hydrogenation. Another product of high interest is ethanol, which may be conveniently manufactured by first hydrating the acetylene to acetaldehyde and then hydrogenating acetaldehyde to ethanol.

The invention may also comprise embodiments such as in the following exemplary paragraphs:

1. A process for preparing a resid-containing hydrocarbon feedstock for use in a regenerative pyrolysis reactor, comprising:

(a) feeding a resid-containing hydrocarbon feedstock to a thermal cracking unit, which is a visbreaker or a coker;

(b) thermally cracking at least 60 wt. % of said resid having a boiling point of at least 565° C. in said hydrocarbon feedstock to form a vapor phase containing cracked hydrocarbons, based upon the total weight of said hydrocarbon feedstock having a boiling point of at least 565° C.;

(c) separating said vapor phase from remaining non-volatiles; and (d) converting the separated vapor phase in a regenerative pyrolysis reactor system into a pyrolysis product.

2. The process of paragraph 1, wherein said thermal cracking unit comprises a visbreaker and the process further comprises feeding a gas selected from the group consisting of hydrogen, methane and combinations thereof to said visbreaking unit while thermally cracking said resid.

3. The process of any preceding paragraph, wherein the separated vapor phase contains less than 2 ppmw metals and at least 75 wt. % of said resid-containing hydrocarbon feedstock is vaporized and fed to said regenerative reactor system, based upon the total weight of said hydrocarbon feedstock.

4. The process of paragraph 2, wherein said gas is at a temperature between 600° C. and 850° C. when introduced into said visbreaker.

5. The process of any preceding paragraph, further comprising maintaining a temperature of the vapor phase during separation at a temperature between 200° C. to 750° C.

6. The process of any preceding paragraph, wherein the regenerative pyrolysis reactor system heats the separated vapor phase to a temperature of at least 1200° C., preferably at least 1500° C., to produce said pyrolysis product.

7. An apparatus for preparing a resid-containing hydrocarbon feedstock for conversion in a regenerative pyrolysis reactor, comprising:
(a) a thermal cracking unit for cracking at least a portion of resid having a boiling point of at least 565° C. in a resid-containing hydrocarbon feedstock;
(b) a separator unit to separate a vapor phase containing cracked hydrocarbons from remaining non-volatiles; and
(c) a regenerative pyrolysis reactor to convert said separated vapor phase hydrocarbons to a pyrolysis product.

8. The apparatus of paragraph 7, wherein the thermal cracking unit includes at least one of a visbreaking unit and a coker.

9. The apparatus of any preceding paragraph, wherein the regenerative pyrolysis reactor comprises (i) a reaction zone for converting the separated vapor phase to $C_2$-$C_4$ unsaturated hydrocarbons within the reaction zone, and (ii) a quenching zone to quench the $C_2$-$C_4$ unsaturated hydrocarbons.

10. The apparatus of any preceding paragraph, wherein separator unit is one of a distillation column, a flash drum, or a knockout drum.

11. The apparatus of any preceding paragraph, wherein said regenerative pyrolysis reactor comprises:
(i) a first reactor having first and second ends and a first channel for conveying a first reactant from said first to said second end, and a second channel for conveying a second reactant from said first to said second end; and
(ii) a second reactor having primary and secondary ends, wherein the first and second reactors are oriented in a series flow relationship with respect to each other.

12. The apparatus of any preceding paragraph, wherein said thermal cracking unit is configured to crack at least 60 wt. % of said resid.

13. A vaporized hydrocarbon feedstock for a regenerative pyrolysis reactor system wherein said vaporized feedstock is derived from a process comprising:
(a) thermally cracking at least 60 wt. % of resid having a boiling point of at least 565° C. in a resid-containing hydrocarbon feedstock to form a vapor phase containing cracked hydrocarbons, based upon the total weight of said hydrocarbon feedstock having a boiling point of at least 565° C.; and
(b) separating said vapor phase from remaining non-volatiles.

14. The vaporized hydrocarbon feedstock of paragraph 13, wherein at least 70 wt % of said resid is thermally cracked and vaporized.

15. The vaporized hydrocarbon feedstock of paragraphs 13 or 14, wherein at least 70 wt. % of said resid-containing hydrocarbon feedstock is vaporized and fed to said regenerative reactor system, based upon the total weight of said resid-containing hydrocarbon feedstock.

While the present invention has been described and illustrated with respect to certain embodiments, it is to be understood that the invention is not limited to the particulars disclosed and extends to all equivalents within the scope of the claims.

The invention claimed is:

1. A process for preparing a resid-containing hydrocarbon feedstock for use in a regenerative pyrolysis reactor, comprising:
(a) feeding a resid-containing hydrocarbon feedstock to a thermal cracking unit;
(b) thermally cracking at least 60 wt. % of said resid having a boiling point of at least 565° C. in said hydrocarbon feedstock to form a vapor phase containing cracked hydrocarbons, based upon the total weight of said hydrocarbon feedstock having a boiling point of at least 565° C.;
(c) separating said vapor phase from remaining non-volatiles; and
(d) converting the separated vapor phase in a regenerative pyrolysis reactor system into a pyrolysis product.

2. The process of claim 1, wherein said thermal cracking unit comprises a visbreaker and the process further comprises feeding a gas selected from the group consisting of hydrogen, methane and combinations thereof to said visbreaking unit while thermally cracking said resid.

3. The process of claim 1, wherein said thermal cracking unit comprises a coker and said process comprises thermally cracking said resid in said coker.

4. The process of claim 2, wherein said gas is at a temperature between 600° C. and 850° C. when introduced into said visbreaker.

5. The process of claim 1, wherein the separated vapor phase is essentially free of non-volatiles.

6. The process of claim 5, wherein the separated vapor phase contains less than 2 ppmw metals.

7. The process of claim 1, further comprising thermally cracking at least 70 wt. % of said resid in said thermal cracking unit.

8. The process of claim 1, wherein step (c) further comprises feeding said vapor phase to a vapor/liquid separation unit.

9. The process of claim 1, further comprising maintaining a temperature of the vapor phase during separation at a temperature between 200° C. to 750° C.

10. The process of claim 1, wherein said regenerative pyrolysis reactor system heats the separated vapor phase to a temperature of at least 1200° C. to produce said pyrolysis product.

11. The process of claim 1, wherein said regenerative pyrolysis reactor system heats the separated vapor phase to a temperature of at least 1500° C. to produce said pyrolysis product.

12. The process of claim 1, wherein at least 75 wt. % of said resid-containing hydrocarbon feedstock is vaporized and fed to said regenerative reactor system, based upon the total weight of said resid-containing hydrocarbon feedstock.

13. The process of claim 1, wherein said vapor phase is converted in said regenerative pyrolysis reactor system to form said pyrolysis product comprising $C_2$-$C_4$ unsaturated hydrocarbons.

14. A vaporized hydrocarbon feedstock for a regenerative pyrolysis reactor system wherein said vaporized feedstock is derived from a process comprising:

(a) thermally cracking at least 60 wt. % of resid having a boiling point of at least 565° C. in a resid-containing hydrocarbon feedstock to form a vapor phase containing cracked hydrocarbons, based upon the total weight of said hydrocarbon feedstock having a boiling point of at least 565° C.; and (b) separating said vapor phase from remaining non-volatiles.

15. The vaporized hydrocarbon feedstock of claim 14, wherein at least 70 wt. % of said resid is thermally cracked.

16. The vaporized hydrocarbon feedstock of claim 14, wherein at least 70 wt. % of said resid-containing hydrocarbon feedstock is vaporized and fed to said regenerative reactor system, based upon the total weight of said resid-containing hydrocarbon feedstock.

* * * * *